(12) United States Patent
Svartz et al.

(10) Patent No.: US 7,077,413 B2
(45) Date of Patent: Jul. 18, 2006

(54) VEHICULAR SPRING SUSPENSION

(75) Inventors: Bjorn O. Svartz, Jamestown, NC (US); Alfred Wingate, Greensboro, NC (US)

(73) Assignee: Volvo Trucks North America, Greensboro, NC (US)

( * ) Notice: Subject to any disclaimer, the term of this patent is extended or adjusted under 35 U.S.C. 154(b) by 0 days.

(21) Appl. No.: 10/839,963

(22) Filed: May 6, 2004

(65) Prior Publication Data

US 2005/0023788 A1 Feb. 3, 2005

Related U.S. Application Data

(60) Provisional application No. 60/468,360, filed on May 6, 2003.

(51) Int. Cl.
*B60G 9/00* (2006.01)
(52) U.S. Cl. .............................................. 280/124.164
(58) Field of Classification Search ......... 280/124.164, 280/124.171, 124.175; 267/52, 260
See application file for complete search history.

(56) References Cited

U.S. PATENT DOCUMENTS

| | | | | |
|---|---|---|---|---|
| 4,705,294 A | * | 11/1987 | Raidel | ................ 280/124.116 |
| 4,946,190 A | * | 8/1990 | Buttner | ................ 280/124.163 |
| 5,328,159 A | * | 7/1994 | Kaufman et al. | ............. 267/52 |
| 5,346,247 A | * | 9/1994 | Snyder | ................ 280/124.116 |
| 6,840,525 B1 | * | 1/2005 | Griffiths | ............. 280/124.116 |

* cited by examiner

*Primary Examiner*—Faye M. Fleming
(74) *Attorney, Agent, or Firm*—Novak Druce & Quigg, LLP

(57) ABSTRACT

Spring suspension for interconnecting an axle to the frame of a commercial, land-based and wheeled vehicle. An end support for an axle is included that has a cantilever spring interconnected by an interposed axle holder to an air-spring bridge. The cantilever spring extends forwardly; that is, toward the front end of the incorporating vehicle, from the axle holder. Oppositely, the bridge extends rearwardly from the axle holder. The forwardly extending cantilever spring elongately extends between two terminal ends thereof. These two ends constitute a front frame-secured end and a back axle holder-secured end. The rearwardly projecting bridge extends between its own two terminal ends, and constitutes a front axle holder-secured end and a back air-spring secured end. The front frame secured end of the cantilever spring is distantly positioned away from the back air-spring supported end of the bridge member. In comparison, the back axle holder-secured end of the cantilever spring is less distantly positioned from the front axle holder-secured end of the bridge.

20 Claims, 4 Drawing Sheets

VEHICULAR SPRING SUSPENSION

CROSS REFERENCE TO RELATED APPLICATIONS

The present patent application claims the benefit of U.S. Provisional Patent Application No. 60/468,360 filed 6 May 2003, said application is expressly incorporated herein by reference in its entirety.

BACKGROUND OF INVENTION

1. Field of the Invention(s)

The present invention(s) relate to vehicle suspension systems; and more particularly, to vehicle suspension systems employing multi-part spring arrangements.

2. Background of the Invention(s)

Suspension systems for commercial vehicles of the type illustrated in FIG. 2 of the accompanying drawings are known. The configuration of the long spring member (PA), however, is not optimal. As an example, to facilitate construction of the monolithic spring member, it is made with a substantially uniform thickness as seen from the side view of FIG. 2, along the entire length. This construction, however, is significantly overbuilt resulting in unnecessary material cost, as well as needlessly adding weight to the incorporating vehicle.

In practice, the forward portion of the spring (PA), that is, the portion of the spring extending to the left-hand side of the axle assembly in FIG. 2, handles approximately ninety percent of the vertical forces imposed on the suspension arrangement during vehicle operation. This imbalance further supports the conclusion that the portion of the spring extending toward the air spring at the right-hand side of the axle assembly in FIG. 2 is drastically overbuilt. Moreover, the inclined portion of this part of the spring, because of the vertical distance over which it must extend and the clearance that must be provided about the axle assembly for proper operation, causes a greater horizontal extension of the distal end of the spring than performance requirements demand.

In view of these detrimental aspects of the traditional spring suspension design of FIG. 2, motivation exists for providing the same or better functionality, while at the same time reducing the overbuilt aspects of the spring.

SUMMARY OF INVENTION

In answer to the needs discussed above, the present invention has been developed. Not only have the same functionalities been achieved as compared to the conventional design, but the arrangement has been made more light-weight and the package size has been reduced, especially with respect to the front-to-back, horizontal dimension.

In at least one embodiment of the present invention, these benefits are delivered via a spring suspension arrangement designed for interconnecting an axle to the frame of a vehicle. As a primary component, the spring suspension arrangement includes an end support for an axle comprising (includes, but is not limited to) a cantilever spring interconnected by an interposed axle holder to an air-spring bridge. The cantilever spring extends forwardly, that is, toward the front end of the incorporating vehicle, from the axle holder. Oppositely, the bridge extends rearwardly from the axle holder. The forwardly extending cantilever spring elongately extends between two terminal ends thereof. These two ends constitute a front frame-secured end and a back axle holder-secured end. The rearwardly projecting bridge extends between its own two terminal ends, and which constitute a front axle holder-secured end and a back air-spring secured end thereof. The front frame secured end of the cantilever spring is distantly positioned away from the back air-spring supported end of the bridge member. In comparison, the back axle holder-secured end of the cantilever spring is less distantly positioned from the front axle holder-secured end of the bridge. These relative lengths better suit the structural demands of the vehicular suspension without causing overbuild in the constituent components.

DETAILED DESCRIPTION

Figure 1:
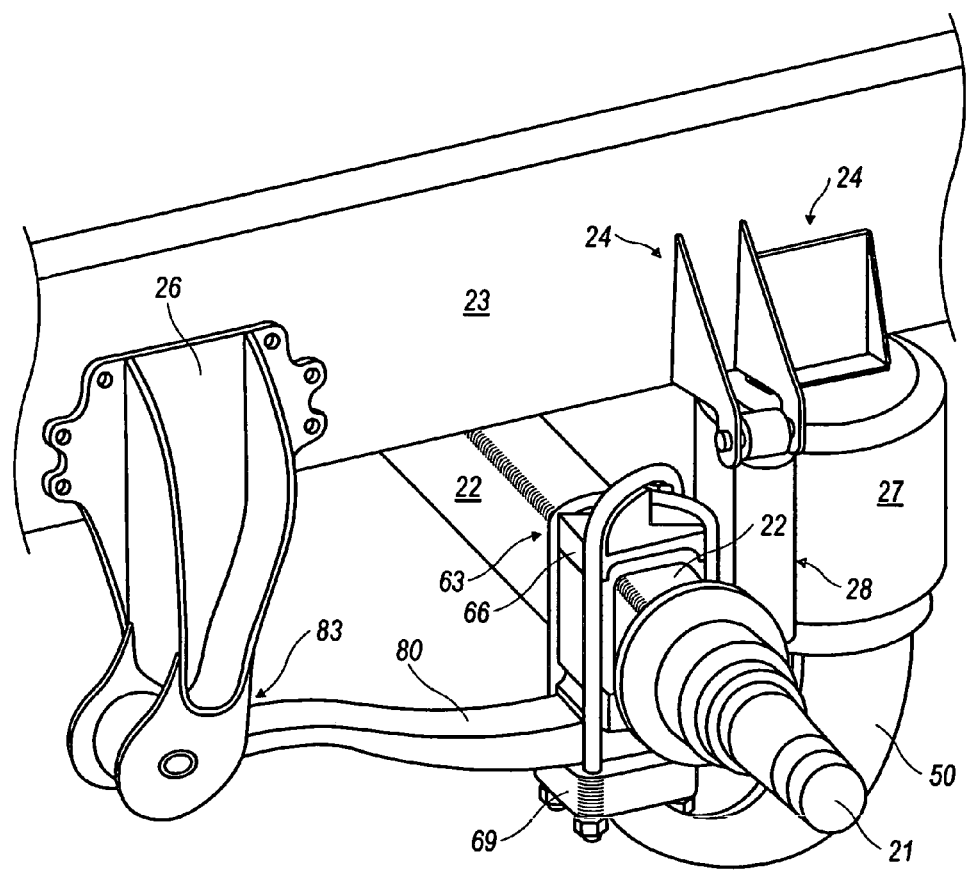
FIG. 1 is a perspective view of vehicular spring suspension arrangement configured according to the teachings of the present invention.

Referring to the accompanying illustrative figures, one-half, or one side of a spring suspension arrangement configured according to the present invention is shown. As will be appreciated by those skilled in these arts, the depicted suspension has a mirror-image counterpart on the opposite side of the carrying vehicle. In FIG. 1, an air spring 27 is shown anchored to a frame member 23 of the vehicle by a bracket 24. An hydraulic damper or shock absorber 28 is also included that primarily serves to dampen-out any induced oscillations in the suspension arrangement. An exposed axle-end 21 is shown that is suitable for receiving a ground engaging wheel and tire assembly thereupon. In an effort to assist in correlating the several embodiments and views of the invention, the same reference numerals have been utilized to designate like structures throughout the present description.

Figure 4:
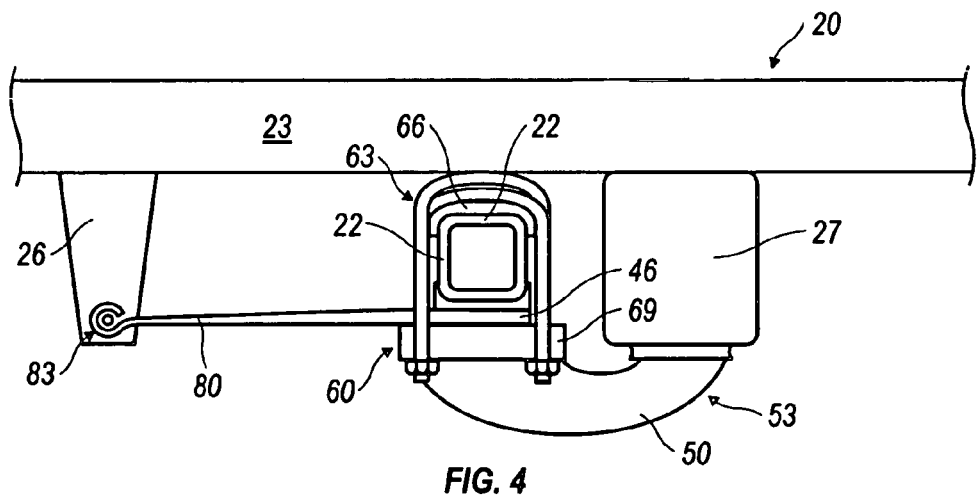
FIG. 4 is a schematic diagram of an alternative embodiment of the vehicular spring suspension arrangement of the present invention.
Figure 5:
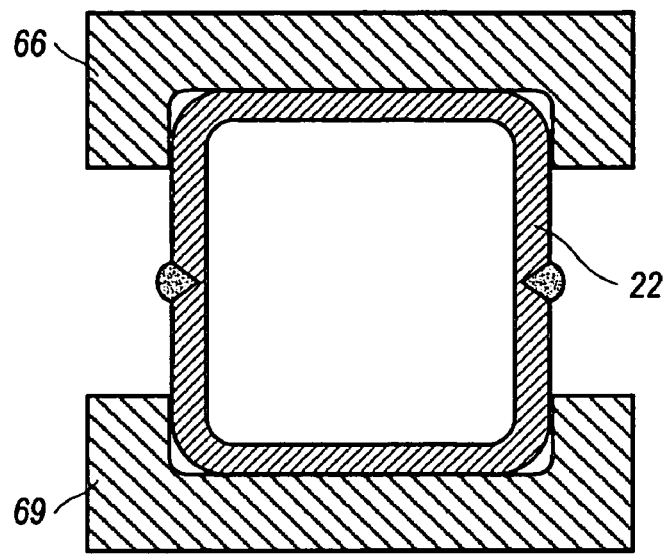
FIG. 5 is a schematic diagram illustrating one embodiment of an axle housing clamping arrangement configured according to the present invention.

In FIG. 1, a perspective view of a spring suspension arrangement is illustrated for interconnecting an axle, including a rotatable axle member 21 carried within an axle housing 22, to the frame 23 of a vehicle. FIG. 4 schematically illustrates substantially the same arrangement, but with simplifications for the sake of clarity. The arrangement includes an end support 20 for the axle. According to the embodiment of FIG. 1, the support 20 incorporates a cantilever spring 80 interconnected by an interposed axle holder 60 to an air-spring bridge 50. The cantilever spring 80 forwardly (with respect to the carrying vehicle) extends from the axle holder 60 to an anchor bracket 26 secured upon the frame member 23 where engagement is made against an abutment stop 29. Oppositely, the bridge 50 rearwardly extends from the axle holder 60. The forwardly extending cantilever spring 30 is elongate in nature, and extends between two terminal ends. For purposes of the present description, the terminology "terminal end" has been adopted to indicate a terminus, or substantially ultimate end of the so-described element. As may be appreciated in FIG. 1, the cantilever spring 80 has a front frame-secured end 83 and a back axle holder-secured end. The rearwardly extending bridge 50 also extends between two terminal ends thereof, and includes a front axle holder-secured end and a back air spring-secured end 53. The front frame secured end 83 of the cantilever spring 80 is distantly positioned from the back air-spring supported end 53 of the bridge member 50. In comparison to that distance, the back axle holder-secured end of the cantilever spring 80 is less distantly positioned from the front axle holder-secured end of the bridge 50. Due at least in part to the shorter length of the bridge 50, as compared to the angled extension of the conventionally designed spring, significant weight savings and more compact size in product packaging is achieved through the present invention, an important feature considering the scarcity of space on an incorporating vehicle.

One feature which assists in the achievement of the more compact size of the suspension spring arrangement is, in a preferred embodiment, that the back axle holder-secured end of the cantilever spring and the front axle holder-secured end of the bridge are positioned substantially one above the other.

Figure 2:
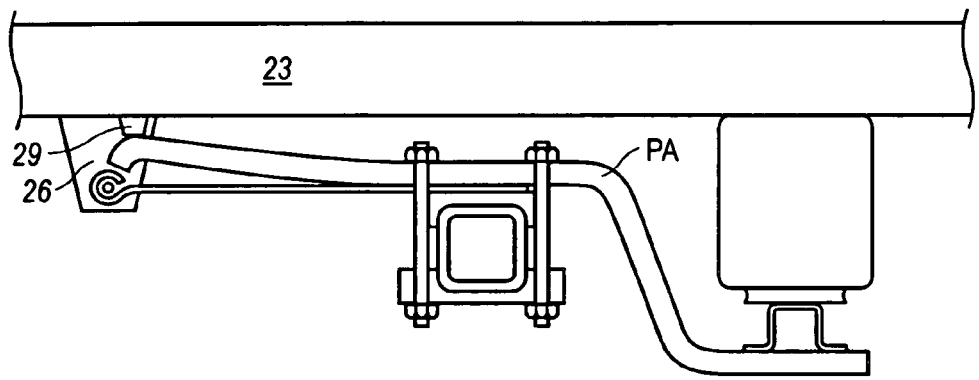
FIG. 2 is a schematic illustration of a conventionally designed vehicular spring suspension arrangement.

In stark comparison to conventional spring design (FIG. 2), the cantilever spring 30,80 of the present invention extends substantially exclusively forward from the axle holder 60.

In a preferred embodiment, the interposed axle holder 60 constitutes the exclusive interconnection between the cantilever spring 80 (30 in the embodiment of FIG. 3 and which will be discussed in greater detail hereinbelow) and the bridge 50.

Figure 3:
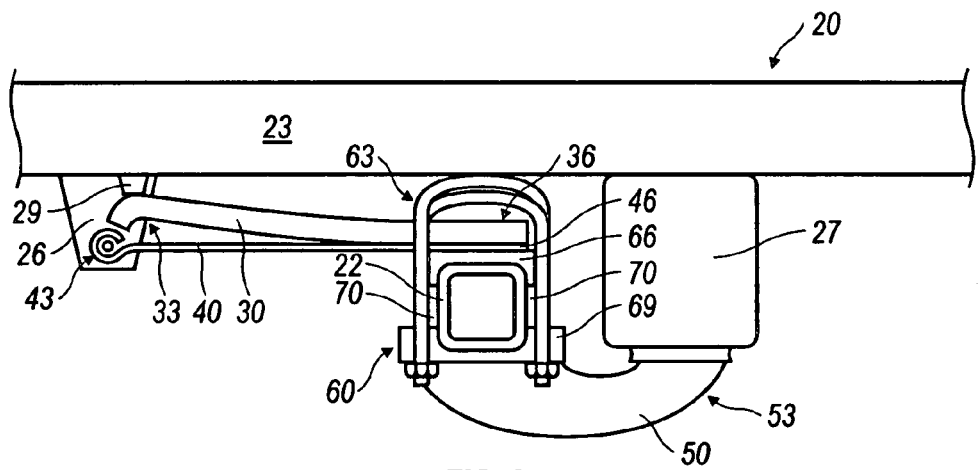
FIG. 3 is a schematic diagram of one embodiment of the vehicular spring suspension arrangement of the present invention.

In FIG. 3, a radius spring 40 is provided that forwardly extends from the axle holder 60 in substantial parallel orientation to the cantilever spring 30. The radius spring 40 has a front, frame-secured, pivoting end 43. In character, the radius spring 40 is flexible in the vertical direction, but is lengthwise, substantially inelastic. As a result, the axle assembly of FIG. 3 is only permitted to move in an arch (as opposed to simple up-and-down, vertical motion) upon encountering bumps, holes and other ground surface inconsistencies. The effective length of the radius spring 40 serves as the radius of the axle's swing arch.

In the exemplary embodiment of FIG. 3, the axle holding assembly 60 constitutes a substantially vertical spacer between the axle secured ends 36 of the cantilever spring 30 and the bridge 50. This feature contributes to the inventions lightweight-nature and compactness because it facilitates the deletion of the vertical portion of the conventional spring shown in FIG. 2.

As may be best appreciated in FIGS. 3 and 4, the horizontal distance between the axle holder 60 and the front frame-secured end 33,83 of the forwardly extending cantilever spring 30,80 is greater than the horizontal distance between the axle holder 60 and the back air-spring secured end 53 of the rearwardly extending bridge 50. In a preferred embodiment, the configuration of the invention permits the forwardly extending cantilever spring 30, 80 to be at least fifty percent greater than the horizontal distance between the axle holder 60 and the back air-spring secured end 53 of the rearwardly extending bridge 50. In an even more preferable embodiment, the same comparative distances are at least two-to-one.

Preferably, the cantilever spring 30, 80 has a capability for resiliently resisting at least twice as much vertical force imposed thereupon from the axle housing 22 than does the air-spring bridge 50. Even more preferably, the factor is at least five times.

From the several Figs., it may be appreciated that a clamping arrangement is employed for securing the cantilever spring 30, 80 and the bridge 50 to the axle housing 22. FIGS. 5–9 illustrate various arrangements of suitable clamping configurations.

As shown, the clamping arrangements comprise at least one squeeze plate 66 or 69, but usually a pair 66 and 69, for exerting a clamping force upon the axle housing 22. The squeeze plates 66, 69 are configured to releasably exert a clamping force upon the axle housing 22. As depicted in FIG. 1, a pair of U-bolts are utilized together to provide releasable tightening of the plates 66, 69 toward and away from one another.

Because the axle housing 22 is not traditionally designed to support the loads directly imposed thereupon by the squeeze plates 66, 69, the illustrative embodiments of the clamping arrangements shown in FIGS. 6–9 further include at least one stress distribution member 70 fixedly secured to the axle housing 22 and abuttingly receiving at least one of the squeeze plates 66, 69. The referenced fixed securement is preferably accomplished using welding 75.

Figure 8:
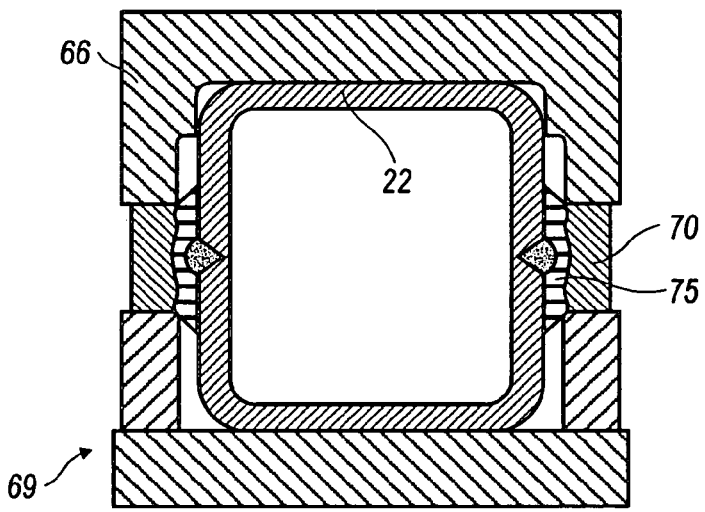
FIGS. 8 is a schematic diagram illustrating another embodiment of an axle housing clamping arrangement.

In one embodiment and as illustrated in FIG. 8, the plurality of stress distribution members 70 can be located upon the axle housing 22 so that at least one of the squeeze plates 66, 69 directly abuts the axle housing 22 when also being abuttingly received upon the stress distribution members 70 in a securing configuration.

Figure 6:
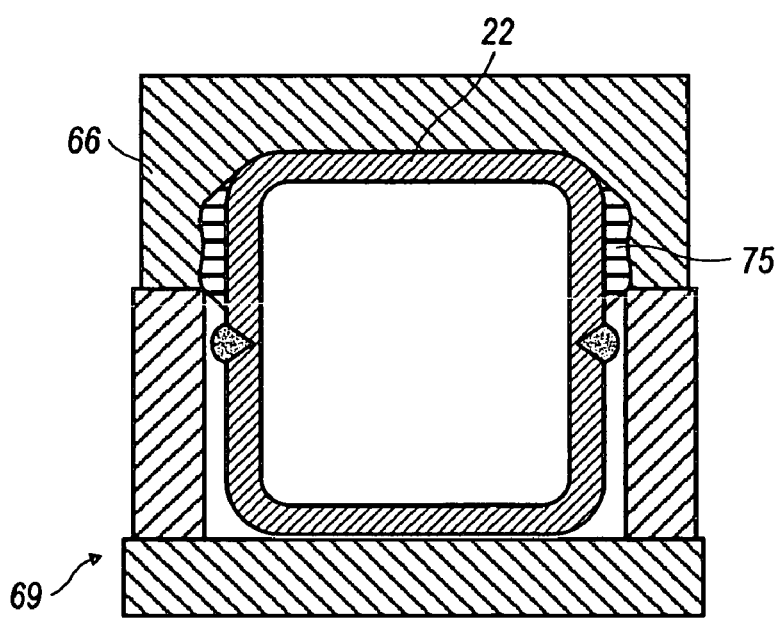
FIG. 6 is a schematic diagram illustrating another embodiment of an axle housing clamping arrangement.
Figure 7:
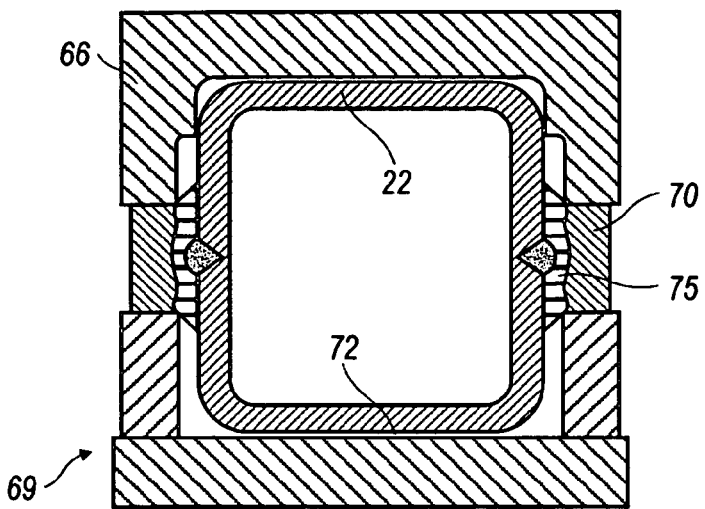
FIG. 7 is a schematic diagram illustrating another embodiment of an axle housing clamping arrangement.

As shown in FIGS. 6 and 7, in an alternative configuration the plurality of stress distribution members 70 are located upon the axle housing 22 so that at least one of the squeeze plates 66, 69 is spaced apart from the axle housing 22 when also being abuttingly received upon the stress distribution members 70 in a securing configuration.

In yet another embodiment and as illustrated in FIG. 7, each of the squeeze plates 66, 69 can be spaced apart from the axle housing 22 when also abuttingly received upon the stress distribution members 70 in a securing configuration.

Figure 9:
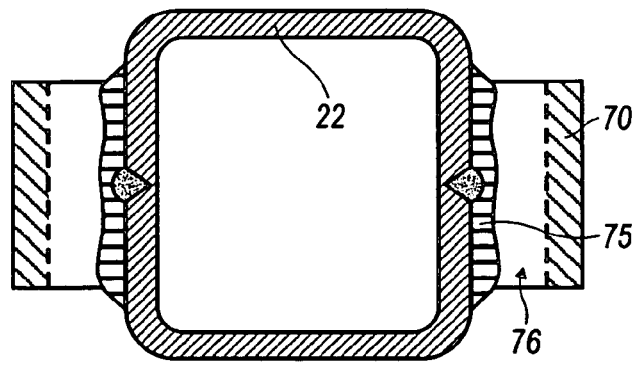
FIG. 9 is a schematic diagram illustrating another embodiment of an axle housing clamping arrangement configured according to the present invention.

FIG. 9 illustrates an embodiment in which apertures are provided through the stress distribution members 70 for insertingly receiving tightenable bolts.

The invention claimed is:

1. A spring suspension arrangement for interconnecting an axle to the frame of a vehicle, said arrangement including an axle end support comprising:

a cantilever spring interconnected by an interposed axle holder to an air-spring bridge, said cantilever spring forwardly extending from said axle holder and said bridge rearwardly extending from said axle holder;

said forwardly extending cantilever spring elongately extending between two terminal ends thereof comprising a front frame-secured end and a back axle holder-secured end; said rearwardly extending bridge extending between two terminal ends thereof comprising a front axle holder-secured end and a back air spring-secured end; and said front frame secured end of said cantilever spring being distantly positioned from said back air-spring supported end of said bridge member, and said back axle holder-secured end of said cantilever spring being less distantly positioned from said front axle holder-secured end of said bridge.

2. The suspension spring arrangement as recited in claim 1, wherein said interposed axle holder constitutes the exclusive interconnection between said cantilever spring and said bridge.

3. The suspension spring arrangement as recited in claim 1, further comprising: a radius spring forwardly extending from said axle holder in substantial parallel orientation to said cantiever spring, said radius spring having a front, frame-secured, pivoting end.

4. The suspension spring arrangement as recited in claim 1, wherein said axle holding assembly constitutes a substantially vertical spacer between said axle secured ends of said cantilever spring members.

5. The suspension spring arrangement as recited in claim 1, wherein the horizontal distance between said axle holder and said front frame-secured end of said forwardly extending cantilever spring is greater than the horizontal distance between said axle holder and said back air-spring secured end of said rearwardly extending bridge.

6. The suspension spring arrangement as recited in claim 1, wherein the horizontal distance between said axle holder and said front frame-secured end of said forwardly extending cantilever spring is at least fifty percent greater than the horizontal distance between said axle holder and said back air-spring secured end of said rearwardly extending bridge.

7. The suspension spring arrangement as recited in claim 1, wherein the horizontal distance between said axle holder and said front frame-secured end of said forwardly extending cantilever spring is at least one-hundred percent greater than the horizontal distance between said axle holder and said back air-spring secured end of said rearwardly extending bridge.

8. The suspension spring arrangement as recited in claim 1, wherein said cantilever spring extends exclusively forward from said axle holder.

9. The suspension spring arrangement as recited in claim 1, further comprising: a clamping arrangement securing said cantilever spring and said bridge to said axle housing.

10. The suspension spring arrangement as recited in claim 9, wherein said clamping arrangement further comprises at least one squeeze plate for exerting a clamping force upon said axle housing.

11. The suspension spring arrangement as recited in claim 9, wherein said clamping arrangement further comprises at least a pair of squeeze plates configured to releasably exert a clamping force upon said axle housing.

12. The suspension spring arrangement as recited in claim 11, wherein said clamping arrangement further comprises at least one stress distribution member fixedly secured to said axle housing and abuttingly receiving at least one of said squeeze plates.

13. The suspension spring arrangement as recited in claim 11, wherein said clamping arrangement further comprises a plurality of stress distribution members fixedly secured to said axle housing and each stress distribution member abuttingly receiving at least one of said squeeze plates.

14. The suspension spring arrangement as recited in claim 13, wherein said plurality of stress distribution members are located upon said axle housing so that at least one of said squeeze plates directly abuts said axle housing when also abuttingly received upon said stress distribution members in a securing configuration.

15. The suspension spring arrangement as recited in claim 13, wherein said plurality of stress distribution members are located upon said axle housing so that at least one of said squeeze plates is spaced apart from said axle housing when also abuttingly received upon said stress distribution members in a securing configuration.

16. The suspension spring arrangement as recited in claim 13, wherein said plurality of stress distribution members are located upon said axle housing so that each of said squeeze plates is spaced apart from said axle housing when also abuttingly received upon said stress distribution members in a securing configuration.

17. The suspension spring arrangement as recited in claim 1, wherein said cantilever spring has a capability or resiliently resisting at least twice as much vertical force imposed thereupon from said axle housing than does said air-spring bridge.

18. The suspension spring arrangement as recited in claim 1, wherein said cantilever spring has a capability for resiliently resisting at least five times as much vertical force imposed thereupon from said axle housing than does said air-spring bridge.

19. The suspension spring arrangement as recited in claim 1, wherein a pair of axle end supports are provided, one at each of two ends of an axle assembly of the vehicle.

20. The suspension spring arrangement as recited in claim 1, wherein said back axle holder-secured end of said cantilever spring and said front axle holder-secured end of said bridge are positioned substantially one above the other.

* * * * *

UNITED STATES PATENT AND TRADEMARK OFFICE
CERTIFICATE OF CORRECTION

| | |
|---|---|
| PATENT NO. | : 7,077,413 B2 |
| APPLICATION NO. | : 10/839963 |
| DATED | : July 18, 2006 |
| INVENTOR(S) | : Bjorn O. Svartz and Alfred Wingate |

It is certified that error appears in the above-identified patent and that said Letters Patent is hereby corrected as shown below:

Col. 5, claim 3 should read
3. The suspension spring arrangement as recited in claim 1, further comprising: a radius spring forwardly extending from said axle holder in substantial parallel orientation to said ~~cantiever~~ cantilever spring, said radius spring having a front, frame-secured, pivoting end.

Signed and Sealed this

Sixth Day of February, 2007

JON W. DUDAS
*Director of the United States Patent and Trademark Office*